US 9,869,992 B2

(12) United States Patent
Takeno

(10) Patent No.: US 9,869,992 B2
(45) Date of Patent: Jan. 16, 2018

(54) THERMAL DISPLACEMENT CORRECTION DEVICE FOR WORKING MACHINE

(71) Applicant: FANUC Corporation, Yamanashi (JP)

(72) Inventor: Shouhei Takeno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 275 days.

(21) Appl. No.: 14/741,774

(22) Filed: Jun. 17, 2015

(65) Prior Publication Data

US 2015/0370242 A1    Dec. 24, 2015

(30) Foreign Application Priority Data

Jun. 18, 2014  (JP) .................................. 2014-125661

(51) Int. Cl.
  *G05B 21/00*  (2006.01)
  *G05B 19/404*  (2006.01)

(52) U.S. Cl.
  CPC .. *G05B 19/404* (2013.01); *G05B 2219/49206* (2013.01)

(58) Field of Classification Search
  CPC ........ G05B 19/404; G05B 2219/49207; G05B 13/02; G05B 2219/49204; G05B 19/182; G05B 19/231; G05B 2219/37431; G05B 2219/49169; G05B 2219/49205;
  (Continued)

(56) References Cited

U.S. PATENT DOCUMENTS 4,334,266 A * 6/1982 Merbach ............ G05B 19/4062
  700/174
4,471,443 A * 9/1984 Kinoshita ............ G05B 19/232
  318/572

(Continued)

FOREIGN PATENT DOCUMENTS

CN    101206146 A    6/2008
CN    103076757 A    5/2013

(Continued)

OTHER PUBLICATIONS

Decision to Grant a Patent dated Oct. 13, 2015, corresponding to Japanese Patent Application No. 2014-125661.

(Continued)

*Primary Examiner* — Darrin Dunn
(74) *Attorney, Agent, or Firm* — Hauptman Ham, LLP

(57) ABSTRACT

Provided is a thermal displacement correction device for a working machine that includes a thermal displacement correction amount calculation unit for calculating a thermal displacement correction amount and configured to correct a thermal displacement amount caused by heat generated and radiated from the working machine and changing with time by the thermal displacement correction amount, the thermal displacement correction device for the working machine including: a correction error coefficient storage memory; a correction precision calculation unit configured to calculate the correction precision of the thermal displacement correction amount based on the thermal displacement correction amount and the correction error coefficient; and a correction precision degradation notification unit.

5 Claims, 3 Drawing Sheets

(58) Field of Classification Search
CPC ............ G05B 2219/49206; G05B 2219/49214;
G05B 2219/49219
See application file for complete search history.

(56) References Cited

U.S. PATENT DOCUMENTS

| | | | | |
|---|---|---|---|---|
| 5,440,398 | A * | 8/1995 | Holowko | B41C 1/04 |
| | | | | 358/3.29 |
| 5,619,414 | A * | 4/1997 | Ishii | G05B 19/404 |
| | | | | 318/565 |
| 5,740,081 | A * | 4/1998 | Suzuki | G05B 19/4015 |
| | | | | 700/159 |
| 6,456,896 | B1 * | 9/2002 | Ito | B23Q 3/15534 |
| | | | | 700/174 |
| 6,471,451 | B2 * | 10/2002 | Kojima | G05B 19/404 |
| | | | | 318/471 |
| 8,457,898 | B2 * | 6/2013 | Hartmann | E21B 47/00 |
| | | | | 166/250.01 |
| 8,613,838 | B2 * | 12/2013 | Wallace | C10G 21/00 |
| | | | | 196/46 |
| 8,924,003 | B2 * | 12/2014 | Maekawa | G05B 19/404 |
| | | | | 356/614 |
| 9,092,025 | B2 * | 7/2015 | Maekawa | B23Q 11/0007 |
| 9,594,357 | B2 * | 3/2017 | Endou | G05B 13/02 |
| 2002/0004688 | A1 * | 1/2002 | Kojima | G05B 19/404 |
| | | | | 700/193 |
| 2004/0222201 | A1 * | 11/2004 | Yamazaki | B23K 26/00 |
| | | | | 219/121.67 |
| 2005/0195867 | A1 * | 9/2005 | Egawa | B23K 31/12 |
| | | | | 372/33 |
| 2005/0257199 | A1 * | 11/2005 | Johansson | G06F 11/3447 |
| | | | | 717/126 |
| 2007/0188123 | A1 * | 8/2007 | Iwashita | G05B 19/404 |
| | | | | 318/625 |
| 2008/0144693 | A1 | 6/2008 | Sato | |
| 2010/0101105 | A1 * | 4/2010 | Hon | B23Q 17/20 |
| | | | | 33/503 |
| 2013/0190921 | A1 * | 7/2013 | Maekawa | B23Q 11/0007 |
| | | | | 700/177 |
| 2013/0302180 | A1 * | 11/2013 | Fujii | B23Q 11/0003 |
| | | | | 417/1 |
| 2014/0074299 | A1 * | 3/2014 | Endou | G05B 13/02 |
| | | | | 700/275 |
| 2014/0135975 | A1 * | 5/2014 | Kobayashi | G05B 19/18 |
| | | | | 700/162 |
| 2015/0012126 | A1 | 1/2015 | Sasaki et al. | |

FOREIGN PATENT DOCUMENTS

| | | |
|---|---|---|
| CN | 104281094 A | 1/2015 |
| JP | H10-138091 A | 5/1998 |
| JP | 3405965 B2 | 5/2003 |
| JP | 2013-146823 A | 8/2013 |
| JP | 2014-54700 A | 3/2014 |

OTHER PUBLICATIONS

Office Action in CN Application No. 201510336576.X, dated Dec. 19, 2016.

* cited by examiner

THERMAL DISPLACEMENT CORRECTION DEVICE FOR WORKING MACHINE

RELATED APPLICATIONS

The present application claims priority to Japanese Application Number 2014-125661, filed Jun. 18, 2014, the disclosure of which is hereby incorporated by reference herein in its entirety.

BACKGROUND OF THE INVENTION

1. Field of the Invention

The present invention relates to a thermal displacement correction device in a working machine, and particularly, to a thermal displacement correction device that notifies degradation in correction precision of a thermal displacement correction.

2. Description of the Related Art

In a working machine, a structure provided therein is expanded or contracted during a processing operation of the working machine due to various factors such as heat of a motor, friction heat of a feeding shaft, cutting heat of a cutting operation, and heat transferred by a temperature of a cutting fluid or various ambient temperatures. Here, a displacement in the relative position between a tool and a workpiece affects the processing precision of the working machine. In order to prevent degradation in processing precision caused by the displacement of the relative position due to the heat, there is a need to correct the relative position between the tool and the workpiece in response to the displacement amount. For that reason, the working machine is equipped with a device that estimates a thermal displacement amount in response to an environment temperature or heat transferred from the above-described heat generation source and corrects the relative position.

As a method of estimating the displacement of the relative position between the tool and the workpiece due to the heat, JP 2013-146823 A discloses a method of calculating a thermal displacement amount of a structure from the amount of heat generated or radiated when the working machine is driven or stopped.

Further, JP 10-138091 A discloses a method of determining a correction amount by using a displacement or a change in temperature detected by a displacement sensor or a temperature sensor for the purpose of obtaining higher correction precision. In the technique disclosed in JP 10-138091 A, it is determined that the thermal displacement amount is not sufficiently estimated when a change in thermal displacement amount calculated by a normal thermal displacement estimation method is larger than a setting value. Then, the thermal displacement amount is measured by the displacement sensor and the correction amount thereof is determined.

Since the displacement caused by heat changes due to various factors such as heat of a motor, friction heat of a feeding shaft, cutting heat of a cutting operation, and an influence caused by a temperature of a cutting fluid or various ambient temperatures, it is difficult to completely estimate the displacement amount by checking the heat generation amount from all heat generation sources and the heat transfer amount to the structure without any sensor. For that reason, there is a difference with respect to the actual thermal displacement amount during a correction.

Since the thermal displacement becomes complex as the temperature distribution in the structure changes, a difference between the thermal displacement estimation amount and the actual thermal displacement amount increases. Accordingly, the correction precision is degraded even when the thermal displacement is corrected. For that reason, there is a case where the expected correction precision may not be obtained even after the correction of the thermal displacement depending on the thermal displacement amount. At that time, there is a need to adjust the offset value of the coordinate of the tool by using a unit other than a thermal displacement correction unit.

In such a case, an operator examines the correction precision by stopping the processing operation. However, when there is not any method of determining whether the sufficient correction precision is maintained by the correction of the thermal displacement, the examination is performed every processing operation, and hence the processing efficiency is degraded.

When the temperature sensor or the displacement sensor is used, the correction precision may be improved. However, the use cause the problem of increase of cost by the sensor use, and protection of the sensor from the influence of chips or coolant. Further, there is a need to consider a case where sufficient correction precision may not be obtained in accordance with the measurement precision of the sensor.

However, there is no working machine having a structure for determining whether the correction precision is sufficient in the correction of the thermal displacement.

SUMMARY OF THE INVENTION

Therefore, an object of the invention is to provide a thermal displacement correction device that estimates correction precision of a thermal displacement correction amount calculated by a thermal displacement correction program and displays a notice for degradation in correction precision when there is a possibility of degradation in correction precision.

According to the invention, there is provided a thermal displacement correction device for a working machine that includes a thermal displacement correction amount calculation unit for calculating a thermal displacement correction amount and configured to correct a thermal displacement amount caused by heat generated and radiated from the working machine and changing with time by the thermal displacement correction amount, the thermal displacement correction device for the working machine including: a correction error coefficient storage memory configured to store a correction error coefficient in response to the thermal displacement correction amount obtained in advance; a correction precision calculation unit configured to calculate the correction precision of the thermal displacement correction amount based on the thermal displacement correction amount calculated by the thermal displacement correction amount calculation unit and the correction error coefficient stored in the correction error coefficient storage memory; a correction precision check unit configured to check whether a processing operation is performed at predetermined correction precision by comparing the correction precision with a threshold value of predetermined correction precision; and a correction precision degradation notification unit configured to notify degradation in correction precision when the correction precision check unit determines that the predetermined correction precision is not satisfied.

The thermal displacement correction device for the working machine may further include a processing operation stop unit configured to automatically stop a processing operation when the correction precision check unit determines that the predetermined correction precision is not satisfied.

Alternatively, the thermal displacement correction device for the working machine may further include: a thermal displacement amount measurement unit configured to measure a thermal displacement amount by using a touch probe or a position sensor when the correction precision check unit determines that the predetermined correction precision is not satisfied; and a thermal displacement correction amount adjustment unit configured to calculate a new thermal displacement correction amount based on the thermal displacement amount measured by the thermal displacement amount measurement unit.

Since the invention has the above-described configuration, it is possible to improve the reliability of the thermal displacement correction function by estimating the correction precision of the thermal displacement correction amount calculated by the thermal displacement correction program and automatically determining whether the precision is within the predetermined precision.

Further, since the processing operation is automatically stopped when the thermal displacement correction precision is degraded, the processing operation which does not fall within the predetermined precision may not be performed.

Furthermore, when the touch probe or the position sensor is used, the automatic adjustment of the offset value and the measurement may be performed only when the correction is not sufficient in the thermal displacement correction function, and hence the number of times of measuring the position may be decreased.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE
PREFERRED EMBODIMENTS

In the embodiment, a thermal displacement correction device corresponds to a numerical control device.

Figure 1:
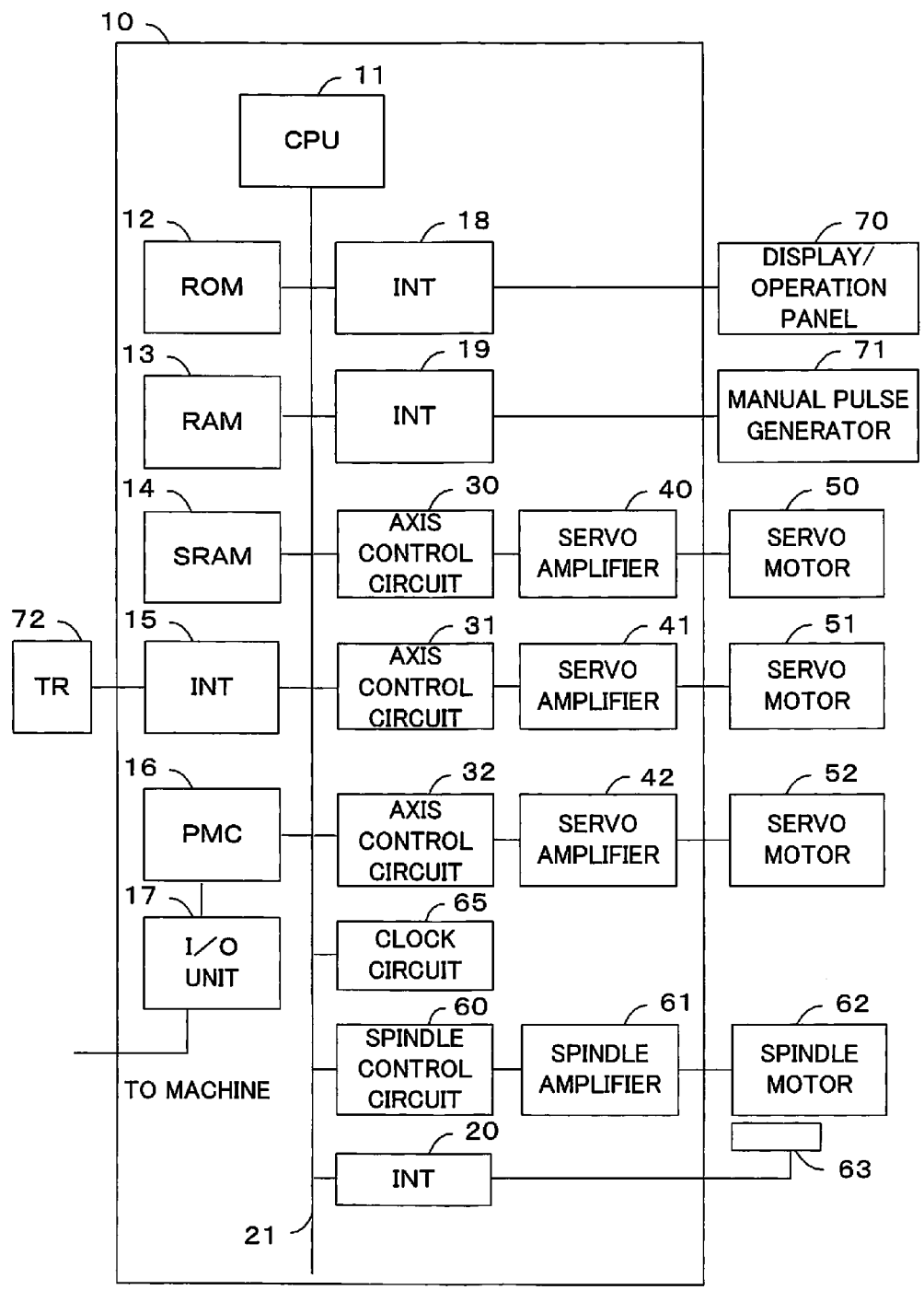
FIG. 1 is a block diagram illustrating a numerical control device of an embodiment of the invention.

FIG. 1 is a functional block diagram illustrating a main part of a numerical control device of a working machine. A processor (CPU) 11 of a numerical control device 10 is a processor that controls the entire numerical control device 10. The processor 11 reads a system program stored in a ROM 12 via a bus 21 and controls the entire numerical control device 10 according to the system program. A RAM 13 stores a temporary calculation data item, a display data item, and various data items input from an operator via an LCD/MDI unit 70.

A SRAM 14 is configured as a non-volatile memory which is backed up by a battery (not illustrated) so that a storage state is maintained even when the power of the numerical control device 10 is turned off. Thus, the SRAM stores a program of measuring an initial position, a program of correcting a thermal displacement of a working machine, a processing program read via an interface 15, which will be described below, and a processing program input via the LCD/MDI unit 70. Further, the ROM 12 previously stores various system programs for performing a process of an automatic operation or a process of an editing mode necessary to create and edit the processing program.

The interface 15 is an interface for an external device that is connectable to the numerical control device 10, and is connected to an external device 72 such as an external storage device. A processing program, a thermal displacement correction amount calculation program, a thermal displacement correction precision estimation program, and the like are read from the external storage device. A PMC (programmable machine controller) 16 controls an auxiliary device in a working machine by the sequence program stored in the numerical control device 10. That is, a signal necessary for the auxiliary device is converted by the sequence program in accordance with the functions M, S, and T instructed by the processing program, and is output from the I/O unit 17 to the auxiliary device. By the output signal, an auxiliary device such as various actuators is operated. Further, signals for various switches of an operation panel disposed on a body of the working machine are subject to necessary processes, and are transmitted to the processor 11.

Image signals such as a current position, an alarm, a parameter, and an image data item for each shaft of the working machine are transmitted to the LCD/MDI unit 70, and are displayed on a display. The LCD/MDI unit 70 is a manual input data input device that includes a display or a keyboard, and an interface 18 receives a data item from the keyboard of the LCD/MDI unit 70 and transmits the data item to the processor 11.

The interface 19 is connected to a manual pulse generator 71. Here, the manual pulse generator 71 is mounted on the operation panel of the working machine, and is used to precisely position the movable unit of the working machine by the control of each shaft using a distribution pulse based on a manual operation.

Control circuits 30 to 32 which move a table T of the working machine in the X, Y, and Z axes receive a movement instruction for each axis from the processor 11 and output an instruction for each axis to servo amplifiers 40 to 42. The servo amplifiers 40 to 42 receive this instruction and drive the servomotors 50 to 52 for the shafts of the working machine. A position detecting pulse coder is provided in each of the servo motors 50 to 52 for the shafts, and the position signals generated from the pulse coders are fed back as a pulse train to the numerical control device 10.

A spindle control circuit 60 receives a main shaft rotation instruction to the working machine and outputs a spindle speed signal to a spindle amplifier 61. The spindle amplifier 61 receives the spindle speed signal, and drives a tool by rotating the tool at a rotation speed instructed by a spindle motor 62 of the working machine.

A position coder 63 is coupled to the spindle motor 62 through a gear or a belt. The position coder 63 outputs a feedback pulse in synchronization with the rotation of the main shaft. The feedback pulse is read by the processor 11 via the interface 20. Reference Numeral 65 indicates a clock circuit which is adjusted to be synchronized with the current time.

Hereinafter, in the embodiment, a method will be described which estimates correction precision for a thermal displacement correction amount and notifies degradation in correction precision.

In the thermal displacement amount monitoring method of the embodiment, a thermal displacement correction amount reference value $h_N$ is used as an index value for monitoring the thermal displacement amount. The thermal displacement correction amount reference value $h_N$ is a numerical value group used to determine a thermal displacement correction degree. The subscript N is a numerical value which is used as the index value of the correction amount and is an integer value. The values of the thermal displacement correction amount reference value $h_N$ are set so as to satisfy a relation of $h_{N-1}<h_N<h_{N+1}$ in order from the small degree of the numerical values of the thermal displacement correction amount.

In the case of $h_N \leq x < h_{N+1}$ when a thermal displacement correction amount x is estimated by a thermal displacement correction program during the operation of the working machine based on the thermal displacement correction amount reference value $h_N$ defined in this way, the correction amount index of the thermal displacement correction amount x may be set as N.

In the embodiment, a correction error coefficient is further used. The correction error coefficient is a coefficient that indicates a degree of an allowable error of the thermal displacement correction amount in the correction amount index N, and is set to a different value in a state where a change in thermal displacement amount is steady or unsteady. When a change amount in the thermal displacement amount (a difference between the precedent thermal displacement amount and the current thermal displacement amount) is equal to or larger than a predetermined threshold value d− and is equal to or smaller than a predetermined threshold value d+, the steady state is set. Otherwise, the unsteady state is set. A correction error coefficient $a_N$ in the steady state and a correction error coefficient $b_N$ in the unsteady state are respectively defined by the following equations.

$$\text{(Steady State)} \quad a_N = SE_{Na} \div \frac{h_N + h_{N+1}}{2} \quad (1)$$

$$\text{(Unsteady State)} \quad b_N = SE_{Nb} \div \frac{h_N + h_{N+1}}{2}$$

In the equation (1), the $SE_{Na}$ indicates a standard error between an actual thermal displacement amount and a thermal displacement correction amount obtained by the thermal displacement correction program in the case where the thermal displacement amount is equal to or larger than $h_N$ and equal to or smaller than $h_{N+1}$, that is, the correction amount index is N when a change amount in the thermal displacement amount is under steady state. Then $SE_{Na}$ is calculated in advance by the repeated test in the steady state, and is stored in the SRAM 14 of the numerical control device 10. The $SE_{Nb}$ indicates a standard error between an actual thermal displacement amount and a thermal displacement correction amount obtained by the thermal displacement correction program when a change amount in the thermal displacement amount is abnormal. The $SE_{Nb}$ is calculated in advance by the repeated test in the abnormal state as in the normal state, and is stored in the SRAM 14 of the numerical control device 10.

The algorithm of the correction precision calculation process during an actual processing operation using the values defined in this way will be described in detail with reference to the flowchart of FIG. 2.

When this process is started, a thermal displacement correction amount x(t) is first calculated (S201). A thermal displacement correction amount calculation program is used in the calculation of the thermal displacement correction amount. Next, a correction amount index N that satisfies the relation of $h_N \leq x(t) < h_{N+1}$ is calculated (S202).

When the correction amount index N of the thermal displacement correction amount x(t) is calculated, it is determined whether a change amount in the thermal displacement correction amount is under steady state or under unsteady state (S203). More specifically, a difference between the thermal displacement correction amount x(t−1) and the thermal displacement correction amount x(t) stored in the memory during the execution of the process is obtained. Then, it is determined whether the relation of d−≤x(t)−x(t−1)≤d+ is satisfied.

In S203, when it is determined that a change amount in the thermal displacement correction amount is under steady state, the correction error coefficient $a_N$ in the steady state of the correction amount index N is read from the memory (S204), and the equation of the correction precision E=x(t)×$a_N$ is calculated by using the read value (S205). Meanwhile, in S203, when it is determined that a change amount in the thermal displacement correction amount is under unsteady state, the correction error coefficient $b_N$ in the unsteady state of the correction amount index N is read from the memory (S206), and the equation of the correction precision E=x(t)×$b_N$ is calculated by using the read value (S207).

Finally, the thermal displacement correction amount x(t) is stored in the memory, and the process ends.

Figure 2:
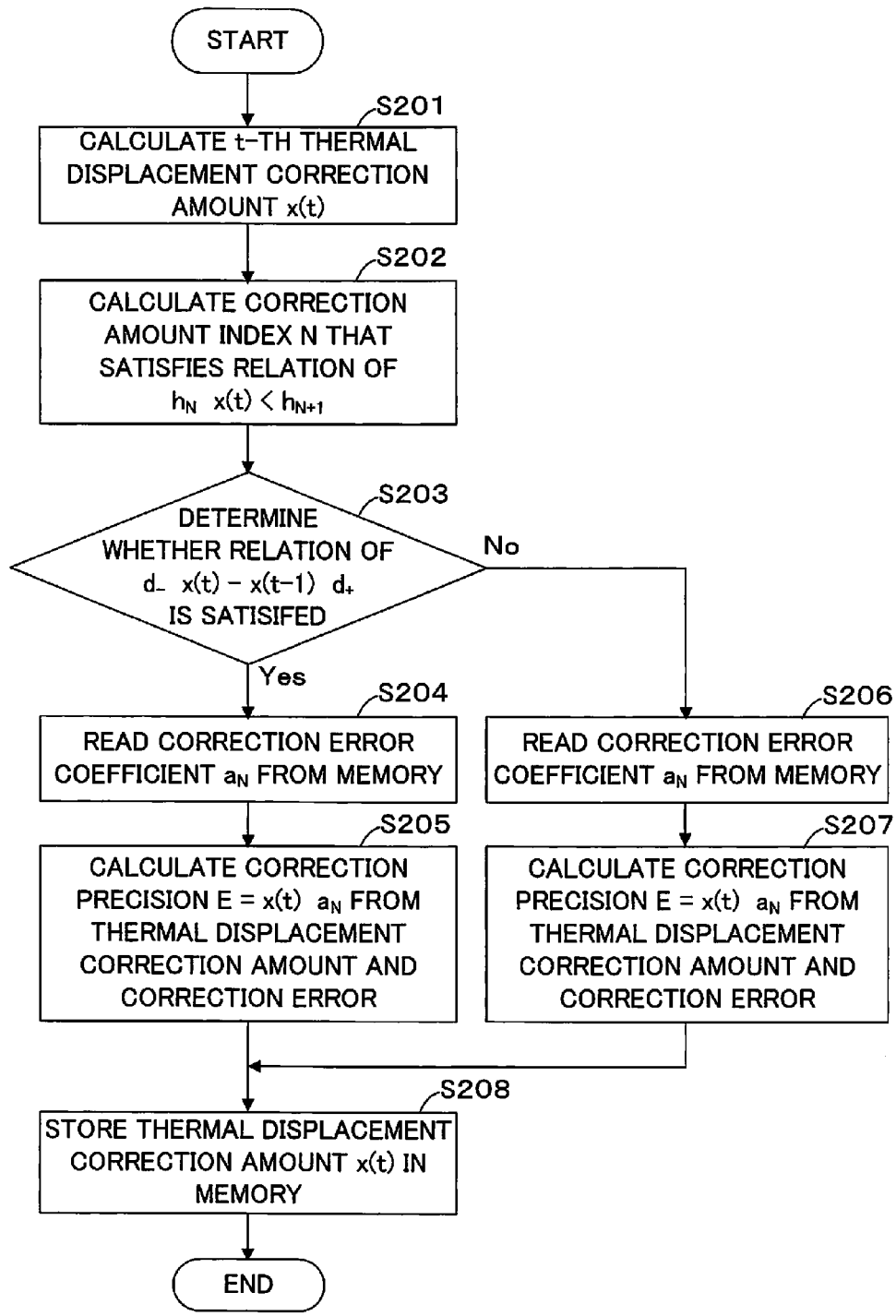
FIG. 2 is a flowchart illustrating a thermal displacement correction amount correction precision calculation process of the embodiment of the invention.
Figure 3:
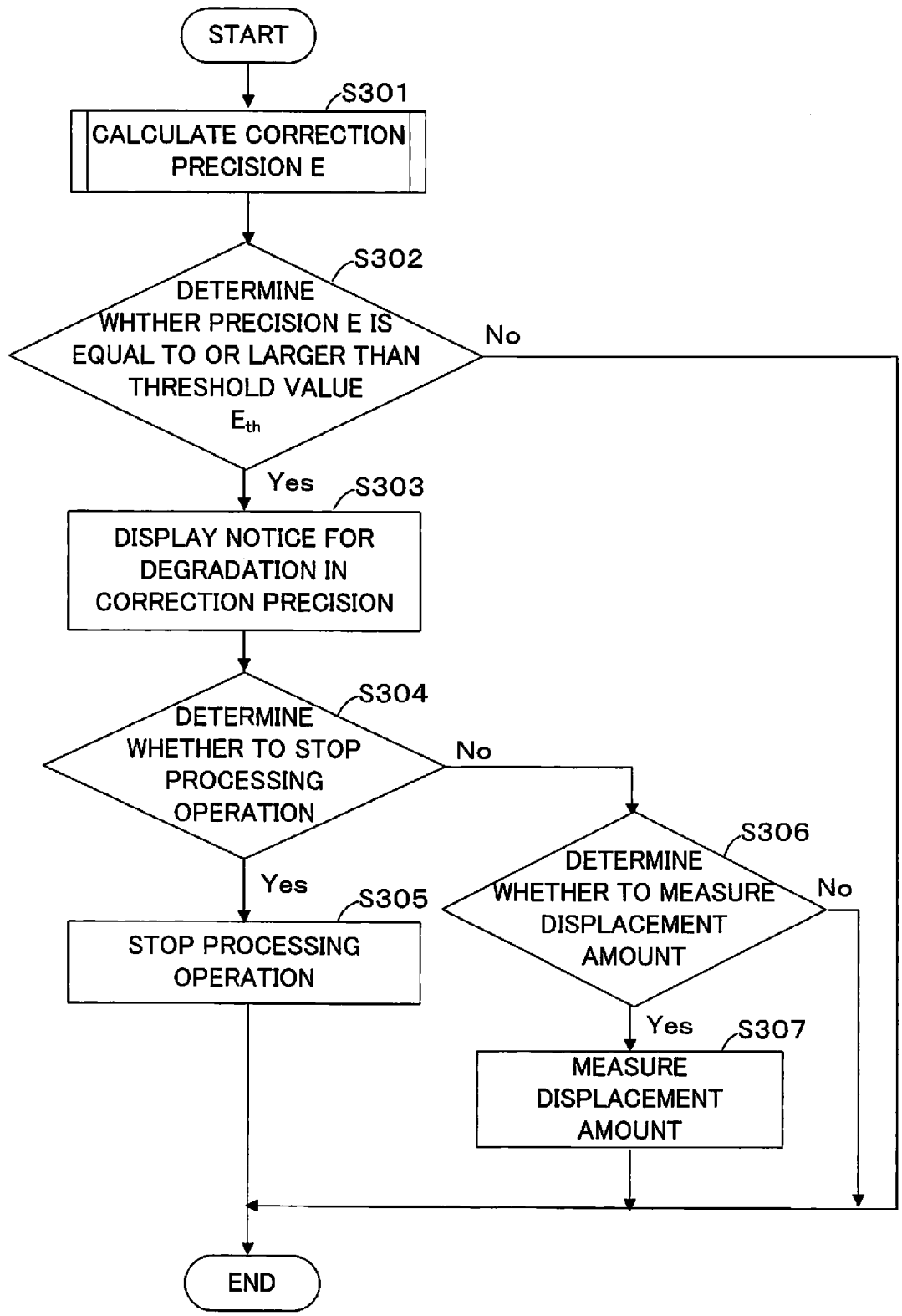
FIG. 3 is a flowchart illustrating a notice process based on correction precision of the embodiment of the invention.

FIG. 3 is a flowchart illustrating an algorithm of a process of determining the correction precision using the correction precision E calculated by the correction precision calculation process described in FIG. 2 and displaying a notice or the like when the correction precision is degraded. In the embodiment, the process of FIG. 3 is repeated at a predetermined interval in the numerical control device 10.

When this process is started, a process of calculating the correction precision E is first performed (S301). When the correction precision E is calculated, it is determined whether the value of the calculated correction precision E is equal to or larger than a predetermined threshold value $E_{th}$ (S302). In S302, when the value of the correction precision E is smaller than a predetermined threshold value $E_{th}$, it is estimated that the precision of the thermal displacement correction amount is sufficiently maintained. Accordingly, the process ends, and the processing operation is continued by using the calculated thermal displacement correction amount.

In S302, when the value of the correction precision E is equal to or larger than a predetermined threshold value $E_{th}$, it is estimated that the precision of the thermal displacement correction amount is not sufficiently maintained. Accordingly, a notice for degradation in correction precision is displayed on the LCD/MDI unit 70 of the numerical control device 10 (S303).

When degradation in correction precision is notified, it is determined whether to stop the processing operation by reading a setting value for the stop of the processing operation stored in the memory (S304). The setting value may be set in advance by an operator before the processing operation starts.

In S304, when the setting value for the stop of the processing operation is set so as to stop the processing operation, a control of stopping the processing operation is performed (S305), and the process ends. In S304, when the setting value for the stop of the processing operation is set so as not to stop the processing operation, it is determined whether to measure the thermal displacement amount by reading a setting value for the measurement of the thermal displacement amount stored in the memory (S306). The setting value may be set in advance by an operator before the processing operation starts.

In S306, when the setting value for the measurement of the thermal displacement amount becomes a value of instructing the measurement, the offset value is automatically adjusted by measuring the thermal displacement amount using a touch probe or a position sensor provided in the working machine in advance (S307). In S306, when the setting value for the measurement of the thermal displacement amount becomes a value of not instructing the measurement, the process ends.

As described above, the thermal displacement correction device of the embodiment may improve the reliability of the thermal displacement correction function by estimating the correction precision and automatically determining whether the precision is within predetermined precision.

Further, since the processing operation is automatically stopped when the thermal displacement correction precision is degraded, the processing operation which does not fall within the predetermined precision may not be performed.

Furthermore, when the touch probe or the position sensor is used, the automatic adjustment of the offset value and the measurement may be performed only when the correction is not sufficient in the thermal displacement correction function, and hence the number of times of measuring the position may be decreased.

The invention claimed is:

1. A thermal displacement correction device for a working machine that includes a thermal displacement correction amount calculation unit for calculating a thermal displacement correction amount and configured to correct a thermal displacement amount caused by heat generated and radiated from the working machine and changing with time by the thermal displacement correction amount, the thermal displacement correction device for the working machine comprising:
   a correction error coefficient storage memory configured to store a correction error coefficient in response to the thermal displacement correction amount obtained in advance; and
   a processor configured to:
      calculate the correction precision of the thermal displacement correction amount based on
         the thermal displacement correction amount calculated by the thermal displacement correction amount calculation unit and
         the correction error coefficient stored in the correction error coefficient storage memory;
      check whether a processing operation is performed at predetermined correction precision by comparing the correction precision with a threshold value of predetermined correction precision;
      notify degradation in correction precision in response to a determination that the predetermined correction precision is not satisfied; and
      automatically stop a processing operation when the processor determines that the predetermined correction precision is not satisfied,
   wherein in response to a determination that the predetermined correction precision is satisfied, the processor is further configured to:
      skip the operation of notifying degradation in correction precision and the operation of automatically stopping the processing operation, and
      continue the processing operation by using the calculated thermal displacement correction amount.

2. The thermal displacement correction device for the working machine according to claim 1, wherein the processor is further configured to:
   measure a thermal displacement amount by using a touch probe or a position sensor in response to a determination that the predetermined correction precision is not satisfied; and
   calculate a new thermal displacement correction amount based on the measured thermal displacement amount.

3. The thermal displacement correction device for the working machine according to claim 1,
   wherein the correction error coefficient storage memory is further configured to store
      a first correction error coefficient when a change in thermal displacement amount is in a steady state; and
      a second correction error coefficient when the change in thermal displacement amount is in an unsteady state, and
   wherein the processor is further configured to calculate correction precision based on the thermal displacement correction amount and the first or the second correction error coefficient stored in the memory.

4. The thermal displacement correction device for the working machine according to claim 1, wherein the predetermined correction precision is set prior to beginning the processing operation.

5. The thermal displacement correction device for the working machine according to claim 1,
   wherein the processor is further configured to
      monitor the variation of the correction precision at a predetermined interval, and
      check whether the monitored variation of the correction precision falls within a predetermined variation.

* * * * *